Feb. 27, 1951 W. M. SHOFFNER 2,543,205
CAM ACTUATOR AND LOCK
Filed Aug. 6, 1948
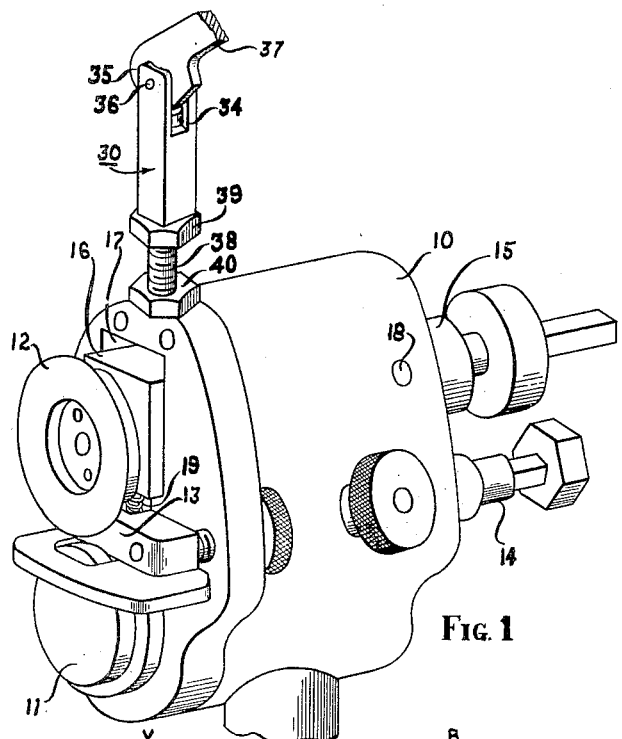
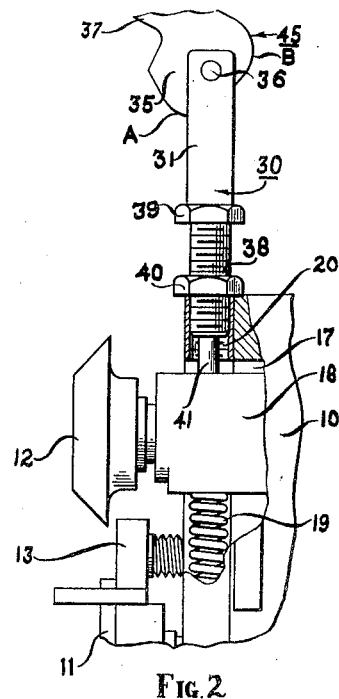
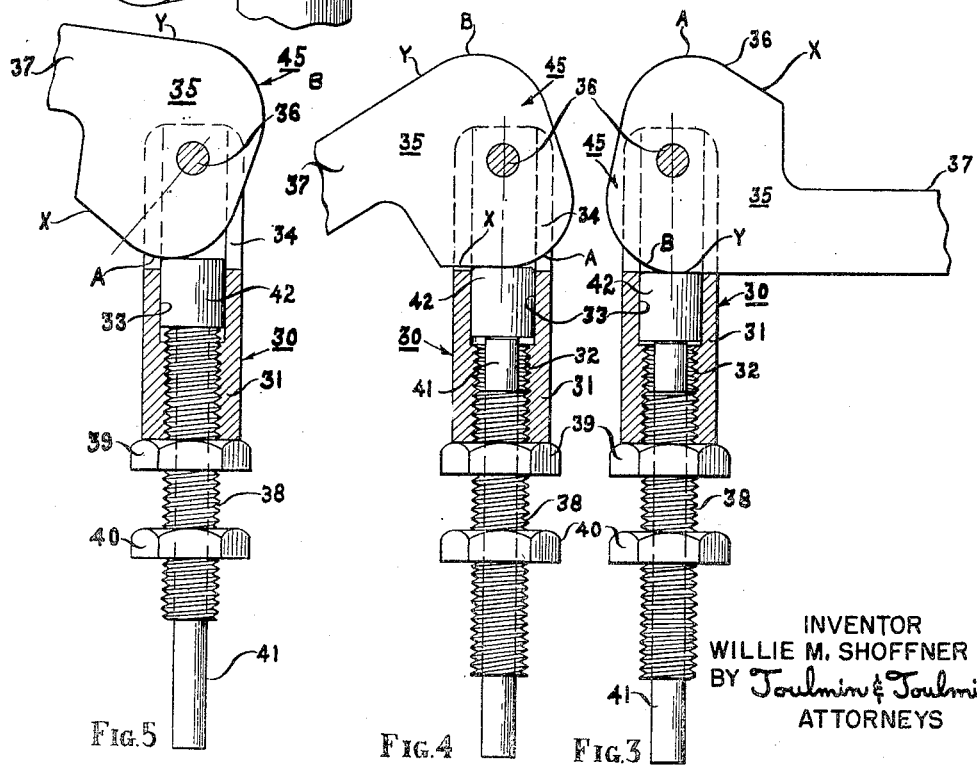
INVENTOR
WILLIE M. SHOFFNER
BY Toulmin & Toulmin
ATTORNEYS Patented Feb. 27, 1951

2,543,205

UNITED STATES PATENT OFFICE 2,543,205

CAM ACTUATOR AND LOCK

Willie M. Shoffner, Dayton, Ohio

Application August 6, 1948, Serial No. 42,959

14 Claims. (Cl. 153—30)

This invention relates to a cam actuator for machine tools, and particularly to a cam actuator for operating conventional sheet metal forming tools to obtain more ease of operation and to provide for duplication of work on standard sheet metal forming tools.

There are existing many sheet metal forming tools that are used in standard sheet metal shops for forming sheet metal to various shapes. These include machines for flanging, beading, trimming, cutting, slitting, roll forming and others. In these machines it is standard practice to provide a screw member with a handle on it so that the screw member can be rotated to place the forming or cutting rolls in proper engagement with sheet metal and cause an initial form or slit whereby to start the sheet metal through the forming tool. However, since these screws must be rotated completely in a reverse direction to permit release of the work after it is complete, and re-positioning of the tools each time a new piece of work is placed into the machine, there is a large amount of waste effort put into opening and closing the forming rolls of the forming machines. Also, it is almost impossible to obtain an exact duplication of work on the standard sheet metal forming tools.

It is therefore an object of this invention to provide a cam actuating device that can replace the usual screw operator to provide for a quicker and easier opening and closing of the forming rolls of the forming machines and to provide for a duplication of work on the machines.

It is still another object of the invention to provide a cam actuator in which the actuator is provided with two positions for locking the forming rolls in closed position, either of which positions of the cam can be selected for use by the operator interchangeably without any change in the setup of the cam actuator.

It is still another object of the invention to provide a cam actuator in accordance with the foregoing object wherein the two positions of the cam actuator are such that they will move the forming rolls to slightly different depths by selection of the correct cam position so that inside and outside beads, as for example, can be formed for perfect fit with one another, the difference in the position of the cams being such as to allow for the thickness of metal between the two bead forms.

It is still another object of the invention to provide a cam actuator which can be so adjusted as to eliminate the cam locking action of the device so that it can be used as a repeat operating device without the locking action.

It is still another object of the invention to provide a cam actuator for sheet metal forming machines wherein the device is capable of opening and closing the forming rolls and yet obtain exact duplication of work.

It is still another object of the invention to provide a cam actuator that is adapted for use on any standard sheet metal forming machine by mere removal of the presently provided screw operator and insertion of the cam actuating device of the invention without causing any alteration on the machine tool.

Further objects and advantages will become apparent from the drawings and the following description.

In the drawings:

Figure 1 is a perspective elevational view of a conventional sheet metal forming machine on which the device of this invention is placed;

Figure 2 is a cross-sectional view of a part of the forming machine shown in Figure 1 to illustrate the operation thereof in more detail;

Figure 3 is a cross-sectional view of the cam actuator showing the device in one of its selected cam locking positions;

Figure 4 is a cross-sectional view similar to Figure 3 but showing the cam actuator in the other of its selective locking positions;

Figure 5 is a cross-sectional view showing the cam actuator as adjusted for use as a repeat mechanism but with the cam locking arrangement ineffective.

The cam actuator of this invention is adapted to replace a screw actuator that is conventionally provided on various standard sheet metal forming machines that are used in sheet metal shops.

In Figures 1 and 2 there is shown a standard sheet metal forming machine on which the device of this invention has been applied. The particular machine illustrated is for forming flanges along the edge of metal sheets. However, the principle of operation of the machine is the same as many other like machines for beading, trimming, slitting, etc., and the device of this invention can be applied to all of the various standard sheet metal forming machines in exactly the same manner illustrated in Figures 1 and 2.

The sheet metal forming machine consists of a body 10 that has a lower forming roll 11 and an upper forming roll 12. A guide fence 13 is provided adjacent the forming rolls 11 and 12 to regulate the depth of flange, in this particular instance.

The lower forming roll 11 is carried on a shaft 14 that is journalled in the body 10 and the upper forming roll 12 is carried on a shaft 15 that is pivotally mounted in the body 10. Either of the shafts 14 and 15 can be driven for rotating the rolls 11 and 12.

Conventionally, the shaft carrying the upper forming roll 12 is journalled in a box 16 that is square-shaped. This box 16 is positioned in a rectangular opening 17 in the body 10 and is pivoted to the body 10 by a pivot pin 18 whereby the forming roll 12 can move up and down relative to the forming roll 11 about the pivot 18.

A compression spring 19 is provided between the box 16 and the body 10 to normally urge the forming roll 12 away from the forming roll 11.

The machine thus far described is a standard and conventional sheet metal forming machine which may be provided with various types of rolls to do various forming operations.

Immediately above the box 16 there is provided a threaded opening 20. In the conventional forming machine, this opening 20 receives a threaded stud that is provided with a handle on it so that the stud can be rotated upwardly and downwardly in the threaded opening 20. The threaded stud engages the upper side of the box 16 and when threaded downwardly against the urgence of the spring 19, the forming roll 12 is moved into operative position relative to the forming roll 11. After a suitable forming operation is performed on a metal sheet, the threaded stud will be rotated in reverse to cause it to move upwardly whereby the spring 19 will urge the roll 12 away from the roll 11 and permit removal of the formed work from between the rolls.

In the conventional forming machine, it will therefore be understood that every time a piece of work is inserted between the rolls, the threaded stud must be rotated downwardly just the right amount to place the upper forming roll into just the right position relative to the lower forming roll so as to obtain a correct action of the forming machine, and each time work is finished, the stud must be reversed to raise the upper forming roll to permit removal of the work. This involves considerable waste effort, and it is almost impossible for an operator to manually adjust the position of the upper forming roll relative to the lower forming roll in exactly the same position on two successive forming operations.

Further, since it is conventional for a sheet metal operator to engage the work at the leading edge by the forming rolls and initially form the leading edge by the downward movement of the upper forming roll relative to the lower forming roll when screwing the stud downwardly, considerable effort is required on the part of the operator to rotate the screw. The fact that there is clearance between the threaded stud and the threaded opening 20 to permit operation of the stud in the threaded opening 20 is sufficient to cause a variation in the position of the upper forming roll relative to the lower forming roll to prevent exact duplication of forming operations.

In this invention the standard threaded stud is removed from the forming machine and the cam actuator and lock 30 of this invention is threaded into place in the threaded opening 20. Once the cam actuator and lock 30 is correctly adjusted, no further adjustments are required, unless forming operations of another kind than those for which it is adjusted are performed on the machine.

The cam actuator and lock is more particularly shown in Figures 3, 4 and 5.

The device consists of a body 31 that has a threaded bore 32. Continuous with the threaded bore 32 there is a plain bore 33 that is slightly larger than the threaded bore 32. In the upper end of the body 10 there is provided a transverse slot 34 which passes through the bore 33.

A cam actuator and lock 35 is rotatably mounted in the slot 34 by means of a pin 36. The actuator 35 includes a handle 37 for operating the same.

A threaded stud 38 has one end thereof threaded into the threaded bore 32 in the body 31. Two lock-nuts 39 and 40 are provided on the threaded stud 38. One of the lock-nuts 39 is adapted to engage the lower end of the body 31 to lock the stud from rotation relative to the body 31 when the stud is correctly adjusted in the body 31. The lock-nut 40 is adapted to engage the body 10 of the forming machine when the device is mounted on the machine in the manner shown in Figures 1 and 2.

The threaded stud 38 is provided with an axial bore that receives an actuating plunger 41 which is slidable in the bore of the threaded stud 38. The upper end of the plunger 41 carries an enlarged head 42 that is slidable in the bore 33 in the body 31.

To mount the device on the forming machine 10, the lower end of the threaded stud 38 is threaded into the threaded opening 20 in the body 10 of the forming machine and the lock-nut 40 tightened upon the body 10 to hold the device in secure position on the body 10.

The actuator 35 is provided with a cam head 45 that has the two cam surfaces A and B thereon provided on substantially opposite sides of the cam head 45. The actuator 35 is adapted to be placed in either of two selective positions, as shown in Figures 3 and 4, to cause engagement of either cam surface A or cam surface B with the head 42 of the actuating plunger 41.

When the device is mounted on the forming machine, as shown in Figures 1 and 2, the actuating plunger 41 engages the upper side of the box 16 that carries the upper forming roll 12 to cause movement of the box against the action of the spring 19, or to permit the action of the spring 19 to move the plunger 41 upwardly when the cam actuator 35 is released.

The cam surface A terminates in a flat surface X while the cam surface B terminates in a flat surface Y. The cam surfaces A and B provide the means for moving the plunger 41 downwardly while the flat surfaces X and Y provide the means for causing locking of the plunger in its downward position.

When the actuator 35 is in locking position with the flat surface Y engaging the flat top surface of the head 42 of the plunger 41, as shown in Figure 3, the spring 19 of the forming machine cannot move the plunger 41 upwardly. It will also be noted that the cam surface B which has moved the plunger to its position shown in Figure 3 terminates at a point that is vertically in alignment with the axis of the pivot pin 36 of the cam head 45 and on the axis of the plunger 41. The cam actuating surface B obtains its greatest radius at this terminus point, and all other radii of the cam surface B from the axis of the pivot pin 36 are less than the radii from the axis of the pin 36 to the terminus of the cam surface B, which also is the starting point of the flat surface Y.

Therefore, when the cam head of Figure 3 is rotated counter-clockwise, there will be an immediate upward movement of the plunger 41. This is essential since if the cam would cause any downward movement of the plunger 41 on the release movement of the cam the upper forming roll would be urged into the sheet metal between the forming rolls with resultant damage either to the work or to the forming machine.

In Figure 4, the cam actuator is shown with the locking surface X engaging the flat top of the head 42 of the plunger 41. In this instance the cam surface A also terminates at a point vertically in alignment with the axis of the pivot pin 36 and on the axis of the plunger 41 so that the function of the cam surface A and the locking surface X is exactly the same as the function of the cam surface B and the locking surface Y.

Thus, the device has two actuating cam surfaces and locking surfaces, either of which may be selectively used by the operator of the device for placing the handle 37 in either position shown in Figures 3 or 4, depending upon the nature of work that is being performed on the forming machine.

Also, the radial distance from the axis of the pivot pin 36 to the juncture point between the cam surface B and the locking surface Y is different from the radial distance between the axis of the pin 36 and the juncture between the cam surface A and the locking surface X by an amount equal to the thickness of metal that is normally worked on forming machines of the kind on which this device is used. This dimensional difference provides a cam actuator wherein two successive forming operations can be performed on two successive metal sheets wherein the formed depth in one metal sheet is slightly greater than the formed depth in another metal sheet. Thus, the two metal sheets can be placed together with the formed depths therein in engagement, and they will fit perfectly because the difference of metal thickness has been taken care of. This is particularly advantageous when forming locking beads used on adjustable pipe-joints and the like.

When setting up a forming machine for working with the device of this invention, it is merely necessary to adjust the threaded stud either in the threaded opening 29 in the machine or in the threaded opening 32 of the device itself to provide for the correct amount of downward travel of the plunger 41 to obtain the desired forming by the forming rolls 11 and 12. Upon obtaining the desired movement with either of the locking surfaces X or Y engaging the head 42 of the plunger 41, the locknuts 39 and 40 can be tightened. When making this adjustment, the handle 37 of the device can be placed in any position about the axis of the plunger 41 to make it most convenient for use by the operator or to place it out of conflict with work that is being passed through the forming machine.

If for any reason the operator of the machine does not desire to use the locking surfaces X and Y to lock the upper roll 12 in position relative to the lower roll 11, as provided for when the cam actuator is in either position shown in Figs. 3 or 4, but merely wishes the upper roll 12 to be moved downwardly to a predetermined position by manually holding the handle 37 downwardly, and to provide for immediate release of the upper roll 12 when the handle 37 is manually released, the threaded stud 38 can be adjusted to a position shown in Fig. 5.

In the position of the threaded stud 38 in Figure 5 is has been adjusted upwardly to a position whereas the head 42 of the plunger 41 will positively engage the upper end of the threaded stud before the locking surfaces X or Y engage the flat surface of the head 42. In this arrangement it will readily be seen that the handle 37 of the device will have to be held by the operator to hold the upper roll 12 of the machine downwardly against the action of the spring 19, and that immediately upon release of the handle 37, the spring 19 will move the upper roll 12 into its open position, as shown in Figure 2.

By use of the device of this invention on any standard sheet metal forming machine it is therefore possible to obtain exact duplication of forming operations, which duplication is almost impossible to obtain on the machines as supplied with the conventional threaded stud which must be manually rotated into and out of position upon each forming operation.

While the device disclosed and described herein constitutes a preferred form of the invention, yet it will be understood that it can be altered mechanically without departing from the spirit of the invention, and that modifications that fall within the scope of the appended claims are intended to be included herein.

Having thus fully described my invention, what I claim as new and desire to secure by Letters Patent is:

1. A cam actuator and lock comprising, a body member, a plunger slidable in said body member, and a cam actuator rotatably mounted on said body member above said plunger for engaging and moving the same, said cam actuator having a cam surface engageable with said plunger to move the same and terminating in a flat locking surface which is disposed normal to a radius line extending between the terminus radius of the cam surface and the axis of rotation of the cam to lock the plunger against return movement.

2. A cam actuator and lock comprising, a body member, a plunger slidable in said body member, and a cam actuator rotatably mounted on said body member above said plunger for engaging and moving the same, said cam actuator having a plurality of cam surfaces thereon having different radius termini whereby to move said plunger to a plurality of selective positions by said actuator, each of said cam surfaces terminating in a flat locking surface which is disposed normal to a radius line extending between the terminus radius of the respective cam surface and the axis of rotation of the cam for engaging said plunger to lock the same against return movement.

3. A cam actuator and lock comprising, a body member, a plunger slidable in said body member, and a cam actuator rotatably mounted on said body member above said plunger for engaging and moving the same, said cam actuator having cam surfaces on substantially opposite sides thereof whereby to move said plunger to either of two selective positions by said actuator, one of said cam surfaces having a terminus radius relative to the axis of rotation of the cam less than the terminus radius of the other cam surface whereby to obtain differential movement of said plunger, each of said cam surfaces terminating in a flat locking surface which is disposed normal to a radius line extending between the terminus radius of the respective cam surface and the axis of rotation of the cam for engaging said plunger to lock the same against return movement.

4. A cam actuator and lock comprising, a body, a threaded bore in said body, a threaded stud received in said threaded bore and adjustable axially therein, a plunger extending axially through said threaded stud and slidable therein, and a cam actuator rotatably mounted on said body on an axis of rotation which is in alignment with the axis of said plunger, said cam actuator having cam actuating surfaces thereon to move said plunger thereby upon selective engagement of said cam surfaces with said plunger, each of said cam surfaces terminating in a flat locking surface which is disposed normal to a radius line extending between the terminus radius of the respective cam surface and the axis of rotation of the cam to prevent return movement of said plunger.

5. A cam actuator and lock comprising, a body, a threaded bore in said body, a threaded stud received in said threaded bore and adjustable axially therein, a plunger extending axially through said threaded stud and slidable therein, and a cam actuator rotatably mounted on said body on an axis of rotation which is in alignment with the axis of said plunger, said cam actuator having cam actuating surfaces thereon on substantially opposite sides of said actuator whereby to move said plunger upon selective engagement of said cam surfaces with said plunger, each of said cam surfaces terminating in a flat locking surface which is disposed normal to a radius line extending between the terminus radius of the respective cam surface and the axis of rotation of the cam to prevent return movement of said plunger, the terminus point between each of said cam surfaces and its cooperating locking surface being in alignment with the axis of said plunger when the respective locking surface is in locking engagement with said plunger.

6. A cam actuator and lock comprising, a body, a threaded bore in said body, a threaded stud received in said threaded bore and adjustable axially therein, a plunger extending axially through said threaded stud and slidable therein, and a cam actuator rotatably mounted on said body on an axis of rotation which is in alignment with the axis of said plunger, said cam actuator having cam actuating surfaces thereon on substantially opposite sides of said actuator whereby to move said plunger upon selective engagement of said cam surfaces with said plunger, each of said cam surfaces terminating in a flat locking surface which is disposed normal to a radius line extending between the terminus radius of the respective cam surface and the axis of rotation of the cam to prevent return movement of said plunger, the terminus point between each of said cam surfaces and its cooperating locking surface being in alignment with the axis of said plunger when the respective locking surface is in locking engagement with said plunger, the terminus radius of one of said cam surfaces being greater than the terminus radius of the other of said cam surfaces whereby to cause differential of movement of said plunger upon selective engagement of said cam surfaces with said plunger.

7. In a sheet metal forming machine the combination of, a pair of cooperating forming rolls adapted to engage and form a metal sheet therebetween, one of said rolls being movable relative to the other for introduction and removal of the metal sheet from between the rolls, resilient means normally urging said movable roll away from the other roll, and a cam actuator and lock mechanism for engaging and moving said movable roll relative to the other roll and comprising, a body member, a plunger slidable in said body member engageable with said movable roll for movement thereof toward to the other roll, and a cam actuator rotatably mounted on said body member above said plunger for engaging and moving the same, said cam actuator having a cam surface engageable with said plunger to move the same and terminating in a flat locking surface which is disposed normal to a radius line extending between the terminus radius of the cam surface and the axis of rotation of the cam to lock the plunger against return movement.

8. In a sheet metal forming machine the combination of, a pair of cooperating forming rolls adapted to engage and form a metal sheet therebetween, one of said rolls being movable relative to the other for introduction and removal of the metal sheet from between the rolls, resilient means normally urging said movable roll away from the other roll, and a cam actuator and lock mechanism for engaging and moving said movable roll relative to the other roll and comprising, a body member, a plunger slidable in said body member engageable with said movable roll for movement thereof toward to the other roll, and a cam actuator rotatably mounted on said body member above said plunger for engaging and moving the same, said cam actuator having cam surfaces on substantially opposite sides thereof whereby to move said plunger to either of two selective positions by said actuator, one of said cam surfaces having a terminus radius relative to the pivot point thereof less than the terminus radius of the other cam surface whereby to cause differential movement of said plunger, each of said cam surfaces terminating in a flat locking surface which is disposed normal to a radius line extending between the terminus radius of the respective cam surface and the axis of rotation of the cam engageable with said plunger to lock the same against return movement.

9. In a sheet metal forming machine the combination of, a body, a pair of cooperating forming rolls carried by said body and adapted to engage and form a metal sheet therebetween, means movably mounting one of said rolls in said body for movement relative to the other roll for introduction and removal of a metal sheet from between the rolls, resilient means normally urging said movable roll away from the other roll, a threaded bore in said body adjacent said movable roll, a threaded stud received in said threaded bore and adjustable axially therein, a body member on said threaded stud and having a threaded bore therein for adjustably positioning said body member on said stud, a plunger extending axially through said threaded stud and slidable therein for engaging and moving said movable roll, and a cam actuator rotatably mounted on said body on an axis in alignment with the axis of said stud, said cam actuator having cam actuating surfaces thereon on substantially opposite sides of said actuator whereby to move said plunger upon selective engagement of said cam surfaces with said plunger, each of said cam surfaces terminating in a locking surface to prevent return movement of said plunger.

10. In a sheet metal forming machine the combination of, a body, a pair of cooperating forming rolls carried by said body and adapted to engage and form a metal sheet therebetween, means movably mounting one of said rolls in said body for movement relative to the other roll for introduction and removal of a metal sheet from between the rolls, resilient means normally urging said movable roll away from the other roll, a threaded bore in said body adjacent said movable roll, a threaded stud received in said threaded bore and adjustable axially therein, a body member on said threaded stud and having a threaded bore therein for adjustably positioning said body member on said stud, a plunger extending axially through said threaded stud and slidable therein for engaging and moving said movable roll, and a cam actuator rotatably mounted on said body on an axis in alignment with the axis of said stud, said cam actuator having cam actuating surfaces thereon on substantially opposite sides of said actuator whereby to move said plunger upon selective engagement of said cam surfaces with said plunger, each of said cam surfaces terminating in a locking surface to prevent return movement of said plunger, the terminus point between each of said cam surfaces and its cooperating locking surface being in alignment with the axis of said plunger when the respective locking surface is in locking engagement with said plunger.

11. A cam actuator comprising, a body member having a bore in said body, a plunger slidable in said bore of said body member, and a cam actuator rotatably mounted on said body member above said plunger and having a cam surface engaging said plunger for movement thereof upon movement of said actuator, said cam surface having a determined terminus radius from which a planar surface extends normal to a radius line extending between the terminus radius and the axis of rotation of said cam actuator whereby to act as a stop at maximum movement of said plunger by said cam surface and lock said plunger against return movement.

12. A cam actuator comprising, a body member having a bore in said body, a plunger slidable in said bore of said body member, and a cam actuator rotatably mounted on said body member above said plunger and having a cam surface engaging said plunger for movement thereof upon movement of said actuator, said cam surface having a determined terminus radius from which a planar surface extends normal to a radius line extending between the terminus radius and the axis of rotation of said cam actuator whereby to act as a stop at the maximum movement of said plunger by said cam surface with the terminus point between said cam surface and said planar surface being in alignment with the axis of said plunger whereby to lock said plunger against return movement.

13. A cam actuator and lock comprising, a body, a threaded bore in said body, a threaded stud received in said threaded bore and adjustable axially therein, a plunger extending axially through said threaded stud and slidable therein, and a cam actuator rotatably mounted on said body on an axis in alignment with the axis of said stud, said cam actuator having a cam actuating surface thereon engaging said plunger to move said plunger upon movement of said actuator, said cam surface terminating in a flat locking surface disposed normal to a radius line extending between the terminus radius of the cam surface and the axis of rotation of the cam to prevent return movement of said plunger upon engagement of said locking surface with said plunger.

14. A cam actuator and lock comprising, a body member, a threaded bore in said body member, a plain bore extending axially from said threaded bore, a transverse slot in said body and extending through said plain bore, a cam actuator rotatably mounted in said slot upon a pin extending transversely thereof, a threaded stud having one end thereof threaded into said threaded bore for adjustably positioning the same therein, a lock nut on said stud for locking the stud in position relative to said body, a plain bore axial through said stud, a plunger slidable in said bore in said stud and having a head in said plain bore in said body for engagement by said cam actuator, said cam actuator having a cam actuating surface thereon for engaging said head of said plunger whereby to move said plunger upon movement of said actuator, said cam surface terminating in a flat locking surface disposed normal to a radius line extending between the terminus radius of the cam surface and the axis of rotation of the cam to prevent return movement of said plunger upon engagement of said locking surface with said head of said plunger.

WILLIE M. SHOFFNER.

REFERENCES CITED

The following references are of record in the file of this patent:

UNITED STATES PATENTS

| Number | Name | Date |
|--------|------|------|
| 1,288 | Brown | Aug. 14, 1839 |
| 628,643 | Abraham | July 11, 1899 |
| 1,055,152 | Erickson | Mar. 4, 1913 |
| 1,171,116 | Haeseler | Feb. 8, 1916 |
| 1,244,604 | Hedmark | Oct. 30, 1917 |
| 1,291,407 | Chapman | Jan. 14, 1919 |
| 1,993,638 | Wiswell | Mar. 5, 1935 |